April 16, 1940. W. ASTLE 2,197,118
HEAT TRANSFER APPARATUS
Filed Oct. 22, 1937 2 Sheets-Sheet 1

Inventor:
William Astle

Patented Apr. 16, 1940

2,197,118

UNITED STATES PATENT OFFICE 2,197,118

HEAT TRANSFER APPARATUS

William Astle, Chicago, Ill.

Application October 22, 1937, Serial No. 170,397

1 Claim. (Cl. 257—2)

My invention relates to heat transfer apparatus. More particularly, it relates to a milk heat transfer apparatus embodying regenerative heat transfer apparatus, heat transfer apparatus for bringing the milk up to a desired temperature, and means for causing a recirculation of the milk through the heating apparatus if it has not reached the desired temperature.

One of the objects of my invention is to provide improved means for insuring that the milk treated is heated to a temperature conforming to legal requirements or to a desired temperature.

A further object of my invention is to provide apparatus, as indicated above, having diversion valve means whereby the milk, after having passed through the heating section, is caused to be returned through the heating section if the temperature of the heated milk is below the legal temperature requirements or below the desired temperature.

A further object of my invention is to provide apparatus as indicated above, in which leak protection means are provided in the diversion valve means for preventing the contamination of milk that has been raised to the predetermined temperature by milk below the predetermined temperature.

A further object of my invention is to provide apparatus as indicated above, in which the milk that is to be heated will always be at a less pressure in the regenerative section than will the milk which has been heated to the required temperature.

Further objects and advantages of the invention will be apparent from the description and claim.

In the drawings, in which an embodiment of my invention is shown,

Figure 1:
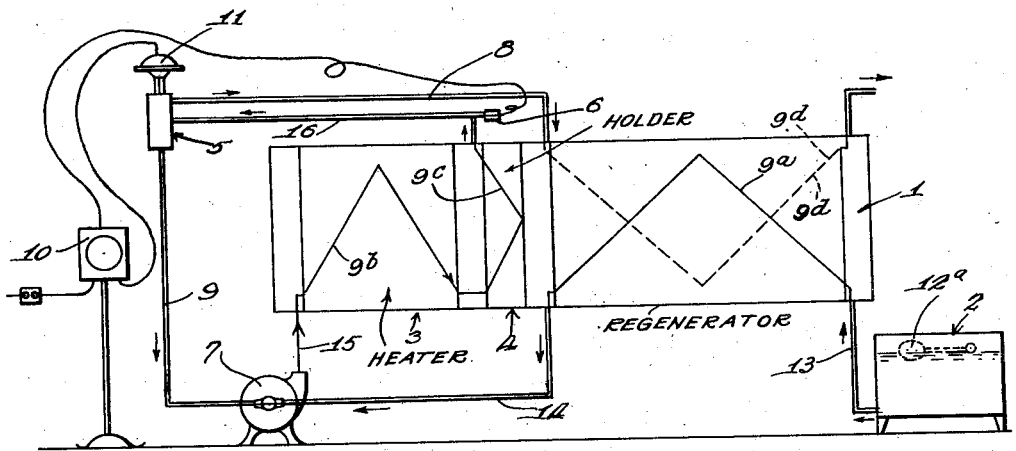
Figure 1 is a diagrammatic view showing the heating apparatus and the fluid circulation.

Referring to the drawings in detail, the construction shown comprises a regenerative heat transfer apparatus 1 for preheating the raw milk and cooling the heated milk, means 2 from which milk is supplied to the regenerative apparatus to be preheated, heating apparatus 3 to which the preheated milk from the regenerative apparatus is supplied, a holding apparatus 4 in which the milk from the heater 3 may be held for a desired length of time, a diversion valve construction 5 controlled by a thermostatic bulb 6 subjected to the temperature of the milk delivered from the holder 4 for selectively controlling the flow of milk from the holder to cause the milk from the holder to be delivered to the regenerative apparatus 1 if it is up to the desired predetermined temperature and to cause it to be recirculated through the heater 3 if it is below the desired temperature, and a pump 7 for effecting the circulation of the milk through the regenerator 1, heater 3, holder 4, and diversion valve 5.

In one position of the diversion valve 5, the milk from the holder 4 is delivered through the pipe 8 to the regenerator 1, and in another position of the diversion valve the milk from the holder 4 is redelivered to the pump 7 through the pipe 9, to be again recirculated through the heater 3 and holder 4 until it is brought up to the desired temperature. The flow of raw milk through the regenerator 1 is indicated diagrammatically by the line $9^a$; the flow through the heater by the line $9^b$, and the flow through the holder by the line $9^c$. The flow of the heated milk from the pipe 8 through the regenerator is indicated diagrammatically by the line $9^d$.

The pump 7, thermostatic bulb 6, control mechanism for the diversion valve 5, heater 3, holder 4, and regenerator 1 may be of any suitable type.

The plate construction used in the heater 3 and regenerator 1, if desired, may be similar to that shown in my copending application Serial No. 161,265, filed August 27, 1937.

The thermostatic bulb 6 may control a relay 10 which may, in turn, control a pneumatic actuator 11 for the diversion valve 5. The construction of the thermostatic bulb 6 and control mechanism is such that if the milk from the holder is below the desired temperature, the diversion valve stem 12 will be in its raised position to cause recirculation, and if the temperature of the milk from the holder is up to the desired temperature, the diversion valve stem will be in its lowered position to cause the milk to flow from the diversion valve direct to the regenerator. The construction is such that the pressure of the heated milk in the regenerative set will be greater than the pressure of the raw milk to be heated, so that there will be no danger of the raw milk leaking into the passages for the heated milk. This may be accomplished by providing a float valve 12a for controlling the milk level in the milk supply 2, thus making the head or pressure on the raw milk supply less than the head or pressure on the heated milk delivered from the regenerative set. The pump 7 will draw the milk from the milk supply 2 through the regenerative apparatus.

The circulation of milk is from the raw milk supply 2, through the pipe 13 to the regenerative set, thence through the pipe from the regenerative set to the pump, thence through the pipe 14 to the pump 7, thence through the pipe 15 to the heater 3 and holder 4, and thence through the pipe 16 to the diversion valve 5. From the diversion valve the flow, depending on the position of the diversion valve, may be either from the diversion valve to the regenerative set 1, through the pipe 8, if the milk is up to the desired temperature, or through the pipe 9 from the diversion valve 5 to the pump 7, if the temperature is below that desired.

Figure 2:
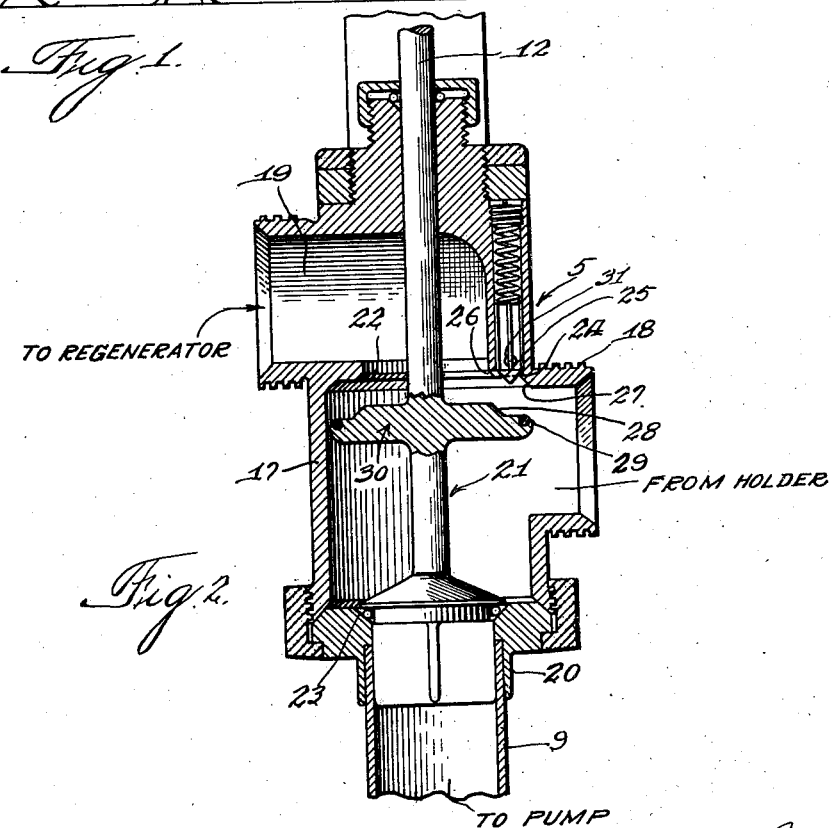
Fig. 2 is an axial section through the diversion valve.

The diversion valve structure shown in detail in Fig. 2 comprises a casing 17 having an inlet 18 connected with the pipe 16 from the holder, an outlet 19 connected with the pipe 8 leading to the regenerative set 1, an outlet 20 connected with the pipe 9 leading to the pump 7 for recirculation, and a two-way valve 21 which, in one position, closes the port 22 leading to the outlet 19 to the regenerative set and opens the port 23 leading to the pump 7 and which, in another position, opens the port 22 leading to the regenerative set 1 and closes the port 23 leading to the pump.

In order to prevent any possibility of contamination of milk which has been raised to the desired temperature from the milk which has not been raised to the desired temperature, a drain valve construction is provided, operative when the valve 21 is in its upper position, the drain valve port 24 being located between two concentric lines of cut-off so that any milk below the desired temperature which may possibly seep past the first annular cut-off of the valve will escape past this drainage valve rather than past the second line of cut-off leading to the passage to the regenerative set. This drainage valve comprises a spring-pressed plunger having a conical valve portion 25 cooperating with the conical valve seat 24 which, as indicated above, lies between two concentric annular conical valve seats 26 and 27 against which the annular valve surfaces 28 and 29 of the upper valve member 30 seat, respectively. Any leakage which may seep past the first line of cut-off at 27 and past the conical valve seat 24 may escape through the discharge opening 31. The drain valve is opened by the engagement of a portion of the valve 30 with the end of the conical portion 25 of the drainage valve when the valve 30 is in its raised position. When the valve portions 28 and 29 are seated, an annular chamber is provided between the annular lines of cut-off, and any milk which may seep into this chamber will escape through the port 31. The valve portion 30 may be a resilient band which can yield so that both valve portions 28 and 29 may seat properly.

In operation, raw milk is supplied to the regenerative set 1 from the raw milk supply 2. The pump 7 is put in operation to draw the milk from the supply tank 2 through the regenerative set 1 and deliver it to the heating and holding sections. If the milk is up to the required temperature, it will flow through the diversion valve 5 and pipe 8 to the regenerative set 1, but if it is not up to the required temperature, it will be directed to the pump 7 through the pipe 9, to be again recirculated through the heating and holding sections 3 and 4 until it is up to the desired temperature.

As previously stated, the pressure of the heated milk in the regenerative set will be greater than the pressure of the raw milk to be heated, so that there will be no danger of the raw milk leaking into the passages for the heated milk.

Also, as previously stated, the plate construction may be similar to that shown in my co-pending application Serial No. 161,265, filed August 27, 1937. This construction is shown in detail in Fig. 3. As shown therein, plates $38^a$, $38^b$, $38^c$, and $38^d$ may be substantially identical in construction, except as to the porting arrangement, alternate plates being reversed, end for end, to enable the countercurrent flow.

Figure 3:
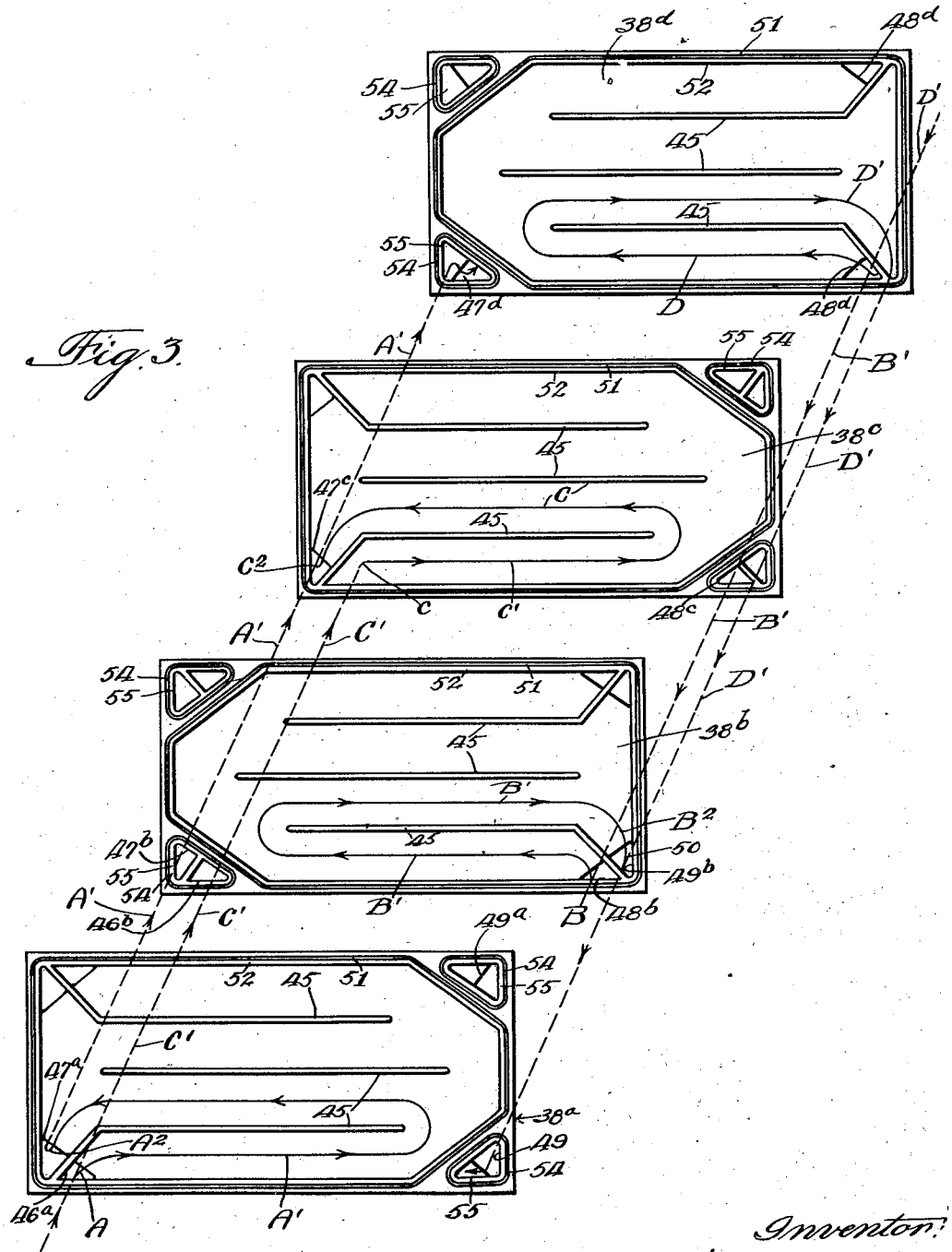
Fig. 3 is a somewhat diagrammatic view showing four heat exchange plates and indicating the fluid flow.

Referring to Fig. 3, and first to the front plate $38^a$, this may be of thin sheet metal, the upper and lower portions of the plate being substantially symmetrical about a horizontal center line, the film flow along the lower half of the plate being duplicated by the film flow along the upper half of the plate. The front face of the plate is provided with flow-directing partitions 45 which will engage the surface of an adjacent plate or of an adjacent terminal block to confine the flow of fluid entering at A to a circuitous path A' leading away from the place of entrance A to the right and thence back to the left to a discharge place $A^2$ adjacent the place of entrance A. Similarly, fluid introduced at B to the front face of the plate $38^b$ will flow on a circuitous path B' away from the place of entrance B to the right and thence back to a place of discharge $B^2$ adjacent the place of entrance. In the arrangement shown in Fig. 3, the milk entering is divided at A into two streams A' and C', one of which (A') flows as described in a circuitous path along the front face of the first plate $38^a$ and thence through aligned ports in the plates $38^a$, $38^b$, $38^c$, and $38^d$, and the other stream C' of which flows through gasketed ports $46^a$ and $46^b$ to the entrance place C between the second plate $38^b$ and the third plate $38^c$ from whence it flows in a circuitous path C', first to the right away from the place of entrance C, thence to the left back to a discharge place $C^2$ adjacent the place of entrance C, where it unites with the stream A', and thence flows through the gasketed ports $47^c$ and $47^d$ to a place of discharge, which is in transverse alignment with the place of entrance so that if desired the flowing fluid can be caused to repeat its flow through another set of four plates, similar to the plates shown in Fig. 3.

The other fluid, with respect to which transfer of heat is to be made, may enter the flow space between the third plate $38^c$ and the fourth plate $38^d$ through the port $48^d$ in the fourth plate $38^d$, as indicated by the arrows, the flow separating at this point, part of the fluid being directed in a circuitous path D' between the third and fourth plates and part of it flowing along the path B' through the ports $48^c$ and $48^b$ in the third plate $38^c$ and second plate $38^b$, respectively, into the flow space between the first plate $38^a$ and second plate $38^b$, where it flows in a circuitous path B', and thence out through the gasketed port $49^a$ in the first plate $38^a$ where the flow may be shifted into transverse alignment with the port of entry $48^d$ in the fourth plate $38^d$ so that, if desired, this fluid may be caused to pass through another set of four plates in front of the four plates shown and similar in construction and arrangement to the four plates shown. It will be seen that the fluid flow divides at $48^d$, one division flowing along the path D' between the third plate $38^c$ and fourth plate $38^d$ and the other division flowing along the path B' between the first plate 38ᵃ and second plate 38ᵇ, and that the discharge from the flow space between the third plate 38ᶜ and fourth plate 38ᵈ and the discharge from the flow space between the first plate 38ᵃ and second plate 38ᵇ unite at 50 and are discharged together through the discharge port 49ᵃ in the front plate. Similarly, the other fluid divides at A into two streams, A' and C', one of which flows in a circuitous path along the front face of the front plate and the other division C' of which flows between the second and third plates, and these two divisions A' and C' again unite at C² and are discharged through the discharge openings 47ᶜ and 47ᵈ in the third and fourth plates.

The stream A' flows successively through ports 47ᵃ, 47ᵇ, 47ᶜ and 47ᵈ. The stream C' branching off from the stream A' flows successively through ports 46ᵃ and 46ᵇ over the surface of the plate 38ᶜ and reunites with the stream A' at C. The stream D' entering the interplate flow space at 48ᵈ flows over the surface of the plate 38ᵈ and then successively through the ports 49ᶜ, 49ᵇ and 49ᵃ. The stream B' branching off from the stream E' flows successively through the ports 48ᶜ and 48ᵇ and over the plate 48ᵇ to the point 50 where it reunites with the stream D' and is discharged through the port 49ᵃ.

Means for controlling the flow may be provided in a suitable manner, such as embossing the plates to provide ridges 45 which will engage an adjacent plate to provide the desired flow passages. It is not necessary that these guide means or partitions be gasketed as a slight leakage will have no detrimental effect, as it is not necessary to maintain absolute separation between the films flowing in the circuitous paths on opposite sides of the guide means or partitions.

It will be seen that this construction enables countercurrent flow to be maintained on opposite sides of all of the plates, this being accomplished by guiding a fluid film to flow in a circuitous path away from a place of entrance adjacent one edge of the plate away from the place of introduction and thence back to a discharge place adjacent the place of introduction and providing on the opposite side of the plate a place of introduction adjacent an opposite edge of the plate and guiding another fluid film to flow in a circuitous path away from the place of introduction and back to a point adjacent the place of introduction, the path on one side of the plate being juxtaposed with respect to the path on the opposite side of the plate.

The outer boundary of the interplate flow space is defined by a six-sided gasket 51 which may be in the form of an endless band of flexible compressible gasket material surrounding a six-sided ridge 52 struck up from the material of the plate. The interplate flow is excluded from two of the corners of the plate to provide room for a triangular gasket construction to enable the through plate flow. The gasketing for the through plate flow may be similar in construction to the gasketing for the interplate flow. This gasketing construction comprises an endless triangular gasket 54 of suitable flexible compressible gasket material stretched around a triangular ridge 55.

With this construction, it will be seen that the pressure of raw milk in the regenerator will always be less than the pressure of the heated milk in the regenerator, both when the pump 7 is running and when it is stopped. When the pump is running, the raw milk in the regenerator is on the suction side of the pump and the pressure of the raw milk in the regenerator is subatmospheric, since the pipes 13 connect with the regenerator at its lower side. When the pump is running, pressure of the heated milk in the regenerator is superatmospheric, since the outlet for the flow 9ᵈ is at the upper side of the regenerator and on the pressure side of the pump 7. Consequently, any leakage of milk past the gaskets while the pump is running will be from the heated milk sides of the plates.

When for any reason the pump 7 is stopped, practically all of the raw milk in the regenerator drains back into the milk supply 2, due to the construction of the plates 38ᵃ, 38ᵇ, 38ᶜ, and 38ᵈ, and due to the fact that the pipe 13 connects to the lower side of the regenerator. There is thus practically no pressure on the raw milk sides of the plates. On the other hand, the heated milk will not drain from the regenerator, since both supply and discharge connections for the heated milk are on the upper side of the regenerator. Consequently, a static pressure heat will exist on the heated milk side of the plates of the regenerator so that any leakage of milk past the gaskets will be from the heated milk sides of the plates to the raw milk side.

Further modifications will be apparent to those skilled in the art and it is desired, therefore, that the invention be limited only by the prior art and the scope of the appended claim.

Having thus described my invention, what I claim and desire to secure by Letters Patent is:

The combination with a milk pasteurizing apparatus comprising a regenerative heat transfer apparatus for preheating the raw milk and precooling the heated milk, means for supplying milk to said regenerative apparatus to be preheated, and heating apparatus to which the preheated milk from the regenerative apparatus is supplied, of means, including diversion valve means controlled by the temperature of the heated milk, whereby the heated milk is caused to be recirculated through the heating apparatus if said heated milk is below a predetermined temperature and is delivered to the regenerative apparatus if its temperature is equal to or greater than the predetermined temperature, said divergence valve means having drainage provisions for preventing leakage of milk which is below a predetermined temperature from mixing with the milk which has previously passed through the valve means on its way to the regenerative apparatus, and means whereby the pressure in the regenerative apparatus of the milk from which heat is to be transferred is greater than the pressure of the milk to which heat is to be transferred.

WILLIAM ASTLE.